US010331806B2

(12) United States Patent
Grassa et al.

(10) Patent No.: US 10,331,806 B2
(45) Date of Patent: Jun. 25, 2019

(54) METHOD FOR PROVIDING AND ASSEMBLING SCAFFOLDING UNITS, EACH OF WHICH WILL BE ASSEMBLED FROM INDIVIDUAL SCAFFOLDING COMPONENTS FOR CONSTRUCTING AN INDUSTRIAL PLANT, IN PARTICULAR A PETROLEUM REFINERY

(71) Applicant: Peri GmbH, Weißenhorn Deutschland (DE)

(72) Inventors: Giovanni Grassa, Ontario (CA); Rod Skelton, Crossfield (CA); Dave Lawrence, Airdrie (CA)

(73) Assignee: PERI GMBH, Niederlassung, Weissenhorn Deutschland (DE)

( * ) Notice: Subject to any disclaimer, the term of this patent is extended or adjusted under 35 U.S.C. 154(b) by 433 days.

(21) Appl. No.: 15/070,525

(22) Filed: Mar. 15, 2016

(65) Prior Publication Data
US 2016/0292311 A1  Oct. 6, 2016

(51) Int. Cl.
*G06F 17/50* (2006.01)
*E04G 1/06* (2006.01)
(Continued)

(52) U.S. Cl.
CPC ........... *G06F 17/5004* (2013.01); *E04G 1/06* (2013.01); *E04G 5/007* (2013.01); *E04G 5/10* (2013.01);
(Continued)

(58) Field of Classification Search
USPC ................. 703/1, 2; 182/113, 128; 135/905
See application file for complete search history.

(56) References Cited

U.S. PATENT DOCUMENTS 3,679,026 A * 7/1972 Hansen ............... E04G 3/18
182/128
3,768,218 A * 10/1973 Blaski ................ E04B 1/3211
52/81.5
(Continued)

FOREIGN PATENT DOCUMENTS

JP    H0944555 A    2/1997
JP    H108706 A    1/1998
JP    2000048061 A    2/2000

OTHER PUBLICATIONS

International Application No. PCT/EP2017/054176 Search Report dated Apr. 6, 2017.

*Primary Examiner* — Thai Q Phan
(74) *Attorney, Agent, or Firm* — Mossman, Kumar & Tyler, PC

(57) ABSTRACT

A method for providing and assembling scaffolding units, each of which will be assembled from individual scaffolding components (of a scaffolding system) for constructing an industrial plant, in particular a petroleum refinery, comprising the following steps: Providing a 3D construction plan of the industrial plant;
  Constructing schedule for the industrial plant in order of occurrence,
  Selecting and drawing of scaffolding units to be used in the individual sections or phases of construction of the industrial plant in the 3D construction plan; Specifying the erection time required to erect the scaffolding unit; Specifying the dismantling time required to dismantle unit; Dividing the construction schedule into time intervals; Calculating for every single time interval, while taking into consideration the erection and dismantling times of the scaffolding units, the respective number of scaffolding components of identical design which are used simultaneously; Determining the maximum num-
(Continued)

ber of scaffolding components of the design which are used simultaneously across all time intervals;

Providing the maximum number of scaffolding components of design alone and including a defined number of a buffer of scaffolding components of design;

assembly of the scaffolding units to be used in a respective phase of construction from the scaffolding components each required for this purpose on-site at a point in time chosen in dependency of the specified erection time each at the latest prior to a start of construction in the respective section of construction specified in the construction schedule.

12 Claims, 5 Drawing Sheets

(51) Int. Cl.
*E04G 5/10* (2006.01)
*E04G 5/14* (2006.01)
*E04G 7/30* (2006.01)
*E04G 5/00* (2006.01)

(52) U.S. Cl.
CPC ............... *E04G 5/14* (2013.01); *E04G 7/307* (2013.01); *G06F 17/5009* (2013.01); *G06F 2217/02* (2013.01)

(56) References Cited

U.S. PATENT DOCUMENTS

| | | | | |
|---|---|---|---|---|
| 4,074,486 A | * | 2/1978 | Grearson | E04B 2/60 52/235 |
| 4,253,549 A | * | 3/1981 | Petren | E04G 1/15 182/150 |
| 4,277,922 A | * | 7/1981 | McAllister | E04B 1/32 135/905 |
| 4,457,115 A | * | 7/1984 | Grearson | E04B 5/40 52/250 |
| 5,205,943 A | * | 4/1993 | Jazzar | B28B 7/0044 249/101 |
| 5,481,842 A | * | 1/1996 | Gautreau | E04B 2/76 403/231 |
| 5,929,421 A | * | 7/1999 | Cherry | G06K 7/1491 235/462.01 |
| 9,273,502 B2 | * | 3/2016 | Bell | E05D 1/04 |
| 2010/0114635 A1 | | 5/2010 | Watanabe et al. | |
| 2011/0132685 A1 | * | 6/2011 | Dos Santos | E04G 1/14 182/113 |

\* cited by examiner

METHOD FOR PROVIDING AND ASSEMBLING SCAFFOLDING UNITS, EACH OF WHICH WILL BE ASSEMBLED FROM INDIVIDUAL SCAFFOLDING COMPONENTS FOR CONSTRUCTING AN INDUSTRIAL PLANT, IN PARTICULAR A PETROLEUM REFINERY

CROSS REFERENCE TO RELATED APPLICATIONS

None.

BACKGROUND OF THE INVENTION

The present invention relates generally to a method for supply and assembly of scaffolding units, which are each to be assembled from individual scaffolding parts of a scaffolding system, for the construction of an industrial plant, in particular a petrol refinery.

The construction of large-scale industrial plants such as a petrol refineries or other plants for the chemical industry requires of an enormous range of scaffolding parts for assembly of scaffolding units to meet the variety of construction requirements. The surface area of said industrial plants generally cover up to several square miles, which necessitates to group the entire construction project into numerous (geographic) sections, where construction work is done simultaneously and/or sequentially. For the construction work, detailed construction plans of the projected industrial plant are created, which are nowadays usually provided as three-dimensional (3D) construction plans. These construction plans, in particular, contain information on all buildings and load-carrying components of the industrial plants as well as on all major installations, e.g. reactors, crackers, cokers, fluid lines for fluid transfer, electrical installations and so forth. It needs to be noted, that due to the complexity and the sear size of the industrial plants, the 3D construction plan may be only incrementally completed while the actual construction of the industrial plant has already been started.

In praxis, the scaffolding components required for the construction of the industrial plant are either arbitrarily determined by way of experience or at best by an analysis of all the parts required for simultaneous completion of all sections of the construction project. Experience has shown however, that the initial cost estimates for the scaffolding in both cases, are exceeded in most instances by far. Following the former approach further carries the risk of costly delays of the construction work.

The object of the invention, therefore, is to provide an improved method for providing and assembling scaffolding units, each of which will be assembled from individual scaffolding components, e.g. of a single predefined scaffolding system, for constructing an industrial plant, in particular a petroleum refinery, and by which the supply and assembly of scaffolding units is further simplified and rendered more cost-efficient.

SUMMARY OF THE INVENTION

The object of the invention is solved by a method for providing and assembling of scaffolding units, which are each to be assembled from individual scaffolding parts of a scaffolding system, for the construction of an industrial plant, in particular a petroleum refinery, according to claim 1.

The method according to the invention comprises the following steps:

Providing a 3D construction plan of the industrial plant;
Providing a construction schedule for the industrial plant in order of occurrence, depicting the individual sections or subsections of construction of the industrial plant to be realized simultaneously and/or successively;
Selecting and drawing of scaffolding units to be used in the individual sections of construction of the industrial plant in the 3D construction plan;
Specifying the erection time required to erect the respective scaffolding unit;
Specifying the dismantling time required to dismantle the respective scaffolding unit;
Dividing the construction schedule into time intervals;
Calculating for every single time interval, while taking into consideration the erection and dismantling times of the scaffolding units, the respective number of scaffolding components of identical design which are used simultaneously;
Determining the maximum number of scaffolding components of identical design which are used simultaneously across all time intervals;
Providing, for constructing the industrial plant, the maximum number of scaffolding components of identical design alone, or providing the maximum number of scaffolding components of identical design including a defined number of a buffer of scaffolding components of identical design;
Beginning of assembly of the scaffolding units to be used in a respective section of construction from the scaffolding components each required for this purpose on-site at a point in time chosen in dependency of the specified erection time each at the latest prior to a start of construction in the respective section of construction specified in the construction schedule.

The method according to the invention allows for a more appropriate provision of individual scaffolding parts which are necessary for the construction of the projected industrial plant. Further, the method according to the invention allows for reduced costs for loan for use, rental, leasing, credit purchase and similar types of contracts for provision of the scaffolding parts. Also, the timing of the mounting of the respective scaffolding units can be improved such that unnecessary and costly delays of the construction work can be reliably prevented. Overall, the scaffolding costs for the construction of the projected industrial plant can thus be overall more easily predicted, monitored and met.

According to a preferred embodiment of the invention, during construction of the industrial plant, the following steps are carried out at intervals, in particular on a daily basis:

Obtaining a current status of the construction progress of the industrial plant and determining the deviations of the construction progress from the construction plan of the industrial plant;
Adapting the construction schedule to the current status of the construction progress by repeating the aforementioned steps f) and g), at least with regards to the outstanding construction of the industrial plant; and
Increasing the defined number of a buffer of scaffolding components of identical design for the further construction of the industrial plant, if the maximum number of scaffolding components of identical design which are used simultaneously during the future time intervals of the adapted time schedule is greater than the number of scaffolding components of identical design which have been provided.

Thereby, an unwanted shortage of the scaffolding components which are necessary for the progress of the construction work can be reliably prevented even in case of an unexpected delay of the construction work.

According to a further preferred embodiment of the invention, in the simplest case, the construction schedule is divided into time intervals which are of equal length. In praxis, this allows for a rather clear and easy implementation of the method according to the invention. Further, according to the invention, shift lengths of scaffolding or transport workers necessary for the handling of the scaffolding components or scaffolding units, respectively, can be taken into consideration for dividing the construction schedule into said time intervals. The construction schedule can e.g. be divided into time intervals of 8, 12 or 24 hours length.

According to an embodiment of the invention, the erection time of the respective scaffolding unit is specified depending on the number of scaffolding components necessary for erection of the scaffolding unit and/or depending on the projected height of the scaffolding unit.

According to a further embodiment of the invention, for each of the scaffolding units required for construction of the industrial plant, an average erection or assembly time is determined in praxis and said average assembly time is specified as the assembly time for the respective scaffolding unit.

According to a further embodiment of the invention, determining the number of scaffolding components of identical design which are used simultaneously across all time intervals is, in each case, carried out by taking into consideration the (expected) transfer time of the scaffolding components from a respective job or storage site to a respective construction section.

According to a further embodiment of the invention, weather and/or climate data for the geographic location of the industrial plant to be erected are gathered and considered/used for specifying the erection time required to erect the respective scaffolding unit and for specifying the dismantling time required to dismantle the respective scaffolding unit.

According to a further embodiment of the invention, specifying the erection time required to erect the respective scaffolding unit and/or specifying the dismantling time required to dismantle the respective scaffolding unit are carried out by taking into consideration a number of scaffolders expected to be available or by predetermining the number of scaffolders.

According to a further embodiment of the invention, aforementioned steps 1d) and 1e) are carried out by taking into consideration a number of scaffolders available or wherein the number of scaffolders available is provided for carrying out method steps 1d) and 1e).

According to a preferred embodiment of the invention, a computer software is used. It is needless to say that the computer software is installed on a suitable computer which may be designed as a personal computer or a server. The server may be located anyplace and be remotely accessed with a personal computer or the like.

According to a further embodiment of the invention, by means of the computer software and a transmission and receiver unit coupled with the software, at least part of the scaffolders are provided with a work order for assembling the scaffolding units for a respective construction section from the scaffolding components necessary for said scaffolding units at the location of said respective construction section by radio. The transmission and receiver unit may be part of a wireless system according to the known GPRS, EDGE, UMTS, LTE or any other suitable standard.

According to a further embodiment of the invention, by means of the computer software and the transmission and receiver unit coupled with the software, transport workers are provided with a transport order for transporting said scaffolding components necessary for assembling of said scaffolding units to the location of said respective construction section by radio.

According to a yet further embodiment of the invention, receipt and/or completion of the order is confirmed by said respective workers with a wireless mobile device and documented electronically by means of the software. Thereby, an overview of the actual progress of the transport/assembly of the scaffolding components or scaffolding units, respectively, is made available. This allows for an early detection of delays of transport of the scaffolding components or assembly of the scaffolding units from the necessary scaffolding components such that measures can be taken in good time and costly delays of the construction progress of the industrial plant can be prevented.

BRIEF DESCRIPTION OF THE DRAWINGS

The following detailed description when taken in conjunction with the figures presented herein provide a complete disclosure of the invention. In the drawing.

DETAILED DESCRIPTION OF THE INVENTION

Figure 1:
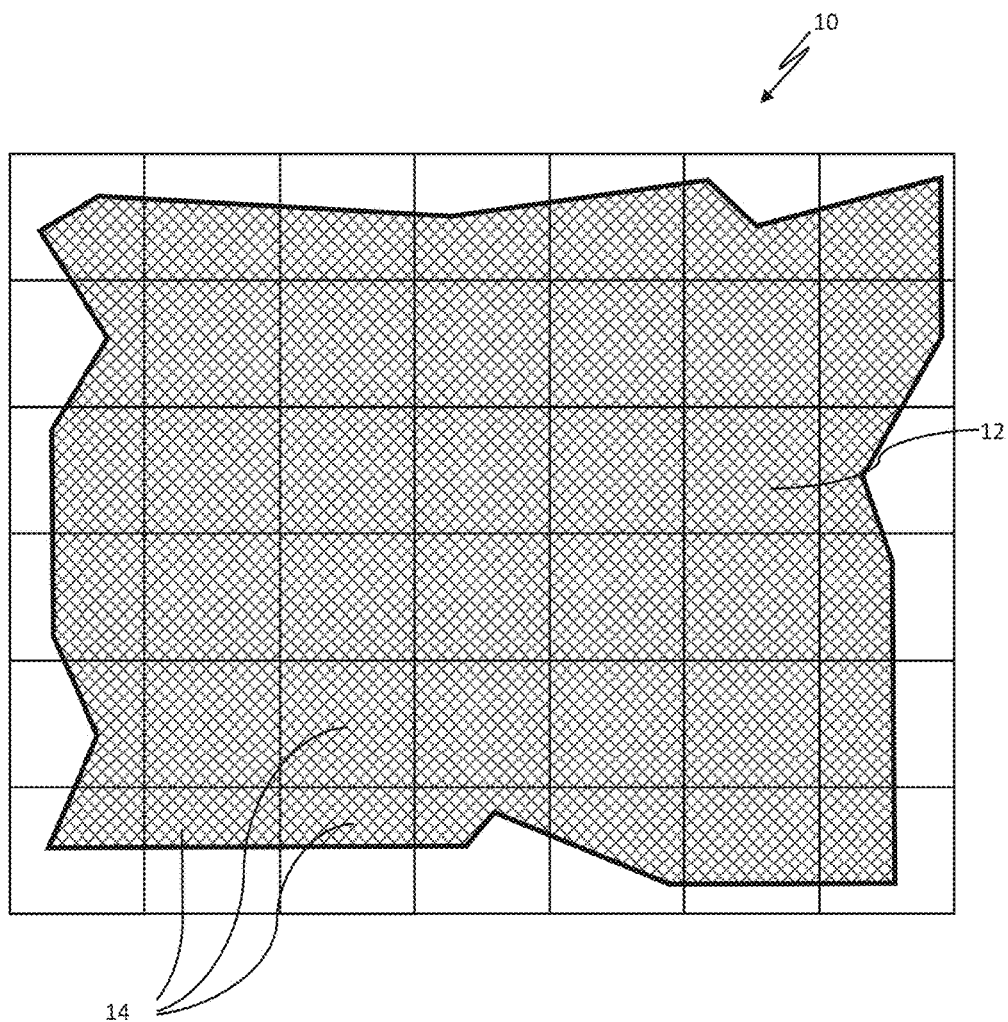
FIG. 1 illustrates a construction plan of a projected industrial plant.

FIG. 1 illustrates a schematic 3D construction plan 10 of a projected industrial plant e.g. a petroleum refinery, and which is generally designated by reference numeral 12. The 3D construction plan 10 comprises a plurality of construction sections 14 of the projected industrial plant 12 which may cover an area of several square miles. For the construction of industrial plant 12, a vast number of so-called scaffolding units is required. Generally, said scaffolding units are temporary structures used to support a work crew and materials to aid in the construction of the industrial plant, that is buildings, chemical reactors, electrical and fluid lines, as well as any other installation of the projected industrial plant. Said scaffolding units are assembled from scaffolding elements or components which are, in general, all part of a manufacturer-specific scaffolding system or of scaffolding systems from different manufacturers which are compatible with each other. Said scaffolding components are structured and designed to be compatible with each other to meet the applicable safety requirements.

Figure 2:
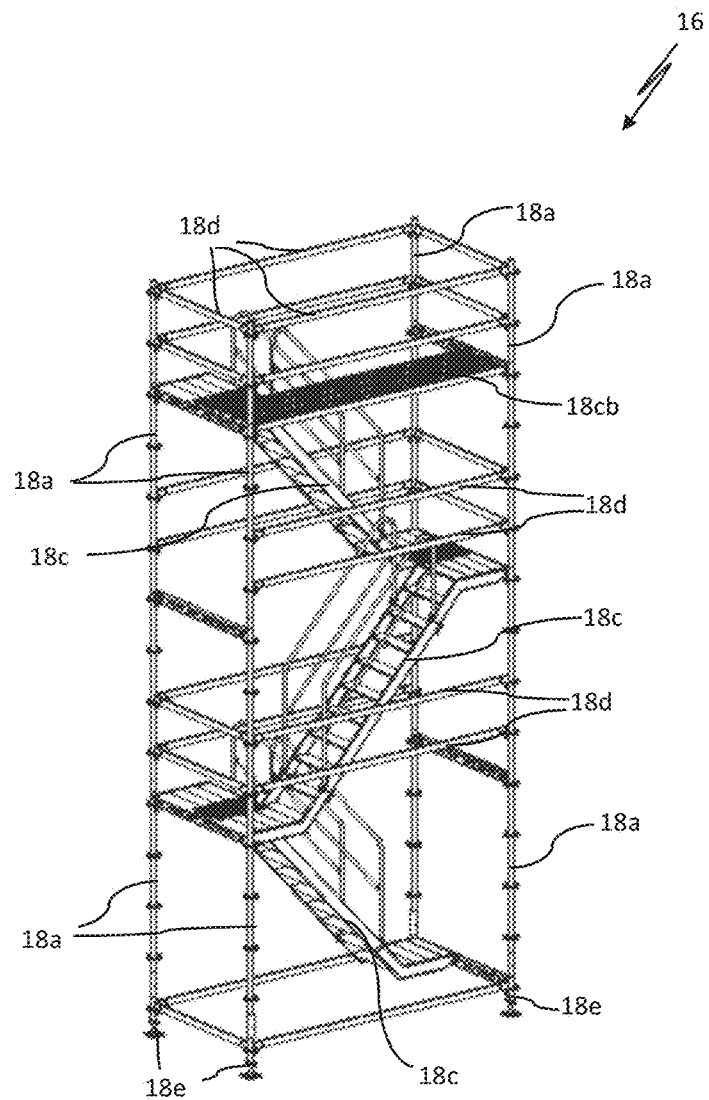
FIG. 2 illustrates an exemplary scaffolding unit of a rather basic construction assembled from various scaffolding components and which is used for construction of the industrial plant according to FIG. 1.

An exemplary scaffolding unit 16 is shown in FIG. 2. It needs to be noted that the illustrated scaffolding unit 16 is, for reasons of presentation, of a rather simple construction. Different constructions of the scaffolding units are easily conceivable. The scaffolding unit 16 is mounted from individual scaffolding components. The scaffolding components 18 of which the scaffolding unit 16 is assembled may comprise e.g. scaffolding posts 18a, scaffolding boards 18b, stairwells 18c, railings 18d, support legs 18e, support struts 18f. The scaffolding units 16 are—regardless of the respective construction—usually assembled from a certain number of scaffolding components 18 of equal design and function.

Figure 3:
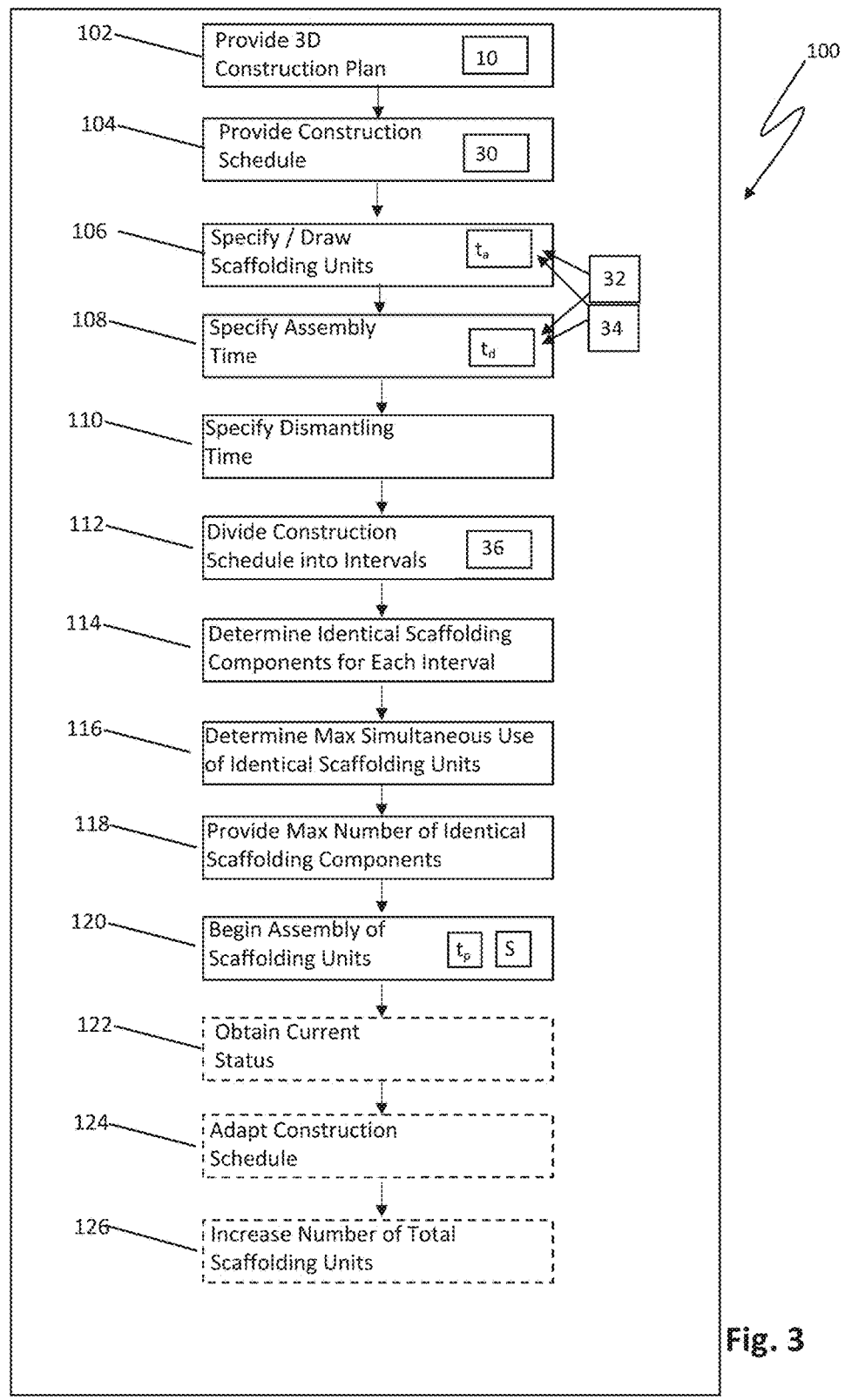
FIG. 3 illustrates a block diagram with essential steps of the method according to the invention for providing and assembling scaffolding units for construction of the industrial plant according to FIG. 1.

Reference is now made to FIG. 3 which shows a schematic diagram of a method 100 according to the invention for providing and assembling scaffolding units 16, e.g. as shown in FIG. 2, each of which will be assembled from individual scaffolding components 18, for constructing the projected industrial plant 12 according to the construction plan 10 shown in FIG. 1.

Figure 4:
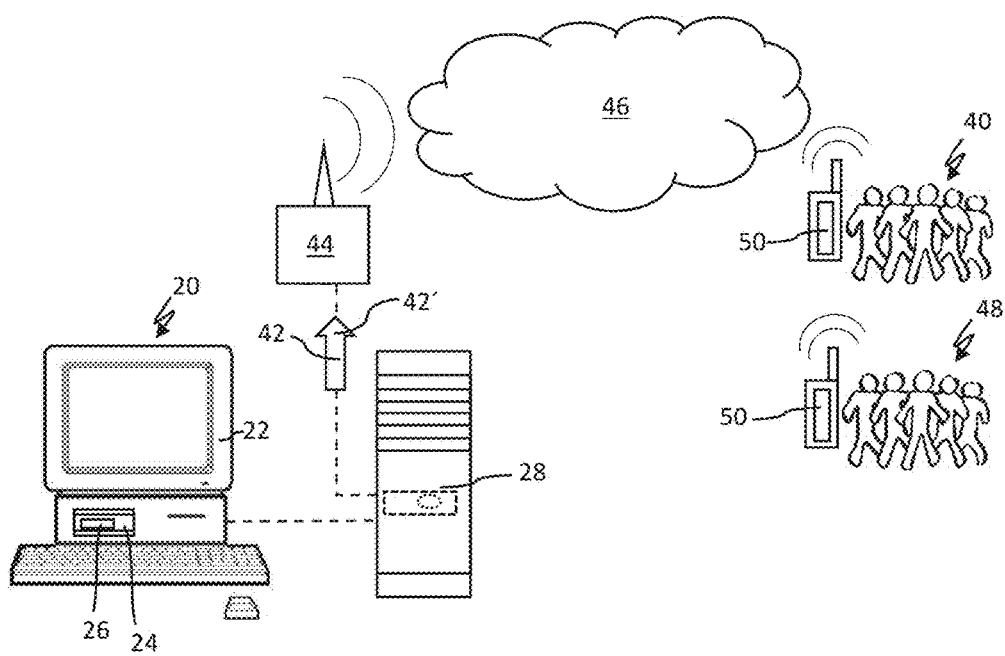
FIG. 4 illustrates a generalized computing platform architecture used for the method depicted in FIG. 1.

In a first step 102 of method 100 the 3D construction plan 10 of the projected industrial plant 12 is preferably provided in a computer-readable electronic format. By this, the 3D construction plan 10 can be visualized on a computer 20 as shown in FIG. 4. Said computer 20 comprises a customary screen 22, a storage medium 24 with a (graphics) software 26 installed thereon. Alternatively, the computer 20 may be electronically linked in any way, e.g. by a computer network, to a remote server 28 on which the scaffolding planning software 26 may be directly installed. It is understood that the computer 20 may be a personal computer or even a mobile device such as a PDA or the like.

Figure 5:
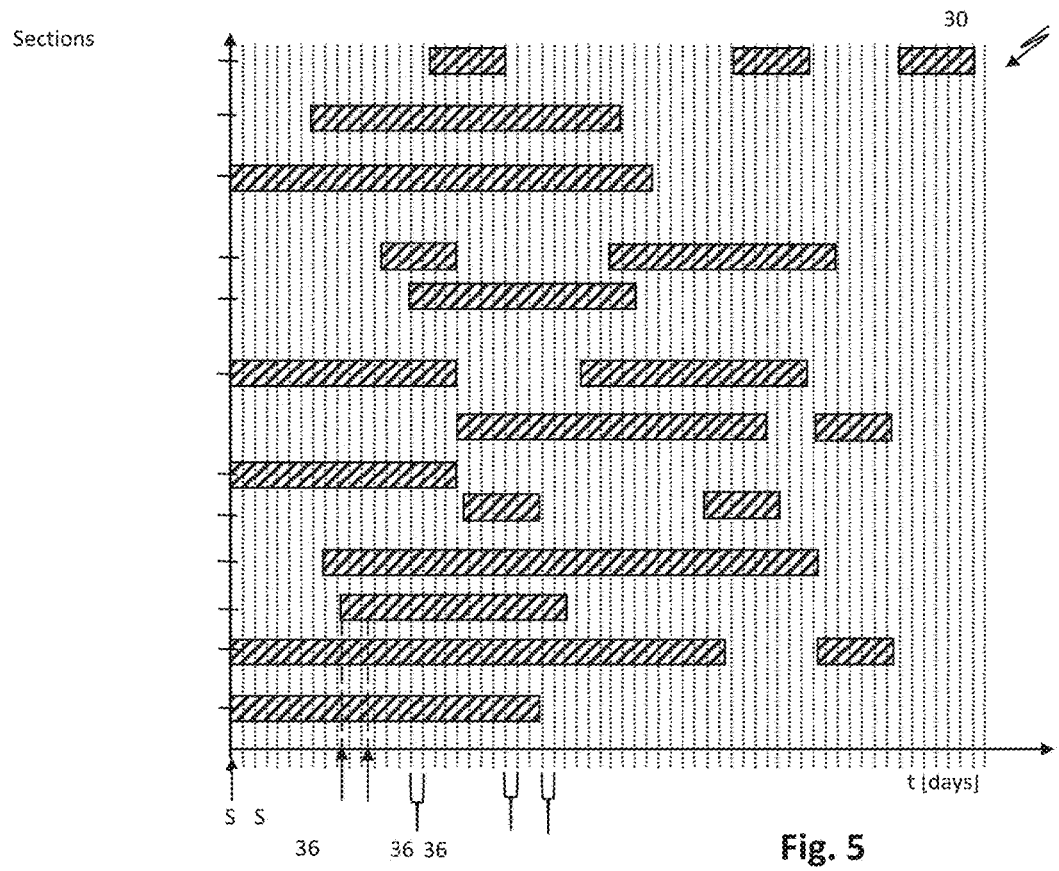
FIG. 5 illustrates a schematic construction plan of the industrial plant according to FIG. 1.

With further reference to FIGS. 3 and 5, the method 100 according to the invention further comprises the step 104 of providing a construction schedule 30 for the industrial plant 12, depicting the individual sections of construction of the industrial plant 12 to be built simultaneously and/or successively. It is to be noted that the construction schedule shown in FIG. 5 is very simplified for purposes of illustration. There, the individual sections of the construction process of the projected industrial plant are depicted over time. The construction schedule 30 is preferably provided in an electronic format such that it is readable (and editable) by computer 20 shown in FIG. 4.

The method 100 according to the invention further comprises step 106 in which the scaffolding units 16 (FIG. 2) to be used in the individual sections of construction of the industrial plant 12 are specified and drawn in the 3D construction plan 10 of the industrial plant 12 (FIG. 1). This is preferably done by means of the aforementioned software 26 installed on computer 20.

In the software 26, the (virtual) scaffolding components 18 available within either a given manufacturer-specific scaffolding system or within scaffolding systems of different manufacturers that are compatible to one another can be on file and which may be used for assembly of the scaffolding units 16 (FIG. 2) for the construction of the industrial plant 12. Further, the software 26 may advantageously provide a range of (virtual) predefined scaffolding units 16 of different shape, size and/or construction and which can be selected and pasted (=drag & drop operation) right into the 3D construction plan, to thereby allow for an easy and time-efficient specification and drawing of the scaffolding units to be used for the construction process.

According to the invention, further method step 108 comprises specifying the (expected) individual erection or assembly time $t_a$ required to erect/assemble each of the respective scaffolding units 16 selected and drawn in the 3D construction plan 10 of the projected industrial plant 12.

In a further step 110, the dismantling or disassembly time $t_d$ required to dismantle the respective scaffolding unit after use is specified. The erection and/or the dismantling time ta, td of the respective scaffolding units 16 can, in particular, be specified depending on the total number of individual scaffolding components 18 necessary for assembly of the respective scaffolding unit 16 and/or depending on the projected size, in particular height, and/or shape of the individual scaffolding unit 16. Also, the disassembly time td as well as the assembly time ta needed in praxis may be determined by way of experiment for a given scaffolding unit.

Also, specifying the erection and/or the dismantling time $t_a/t_d$ of the respective scaffolding unit 16, available weather and/or climate data 32, 34 for the geographic location of the industrial plant 12 to be erected may be taken into consideration. Thereby, additional time needed for erecting/dismantling of the respective scaffolding units 16 due to e.g. extreme ambient temperatures and precipitation, high humidity and so forth, can be anticipated and taken into account. Further, for specifying the required erection and/or the dismantling time $t_a$, $t_d$ for the respective scaffolding units 16, the number of scaffolders expected to be available for performing these works are advantageously taken into consideration.

A further step 112 of the method according to the invention comprises dividing the construction schedule 30 into a plurality of phases or time intervals 36 as is shown in FIG. 5. The time intervals 36 may each have a length of e.g. 8, 12, or 24 hours or more and may further be of equal length each. The construction schedule thus shows a grid-like pattern. In FIG. 5, an exemplary start of construction in a respective section or subsection of construction is denominated S.

In a further step 114 of the method 100 according to the invention, for each phase or time interval 36, the respective (total) number n of scaffolding components of identical design which are used simultaneously are determined, in particular calculated, while taking into consideration the erection and dismantling times $t_a$, $t_d$ of the scaffolding units 16. This may also be done by means of the aforementioned computer software 26.

Figure 6:
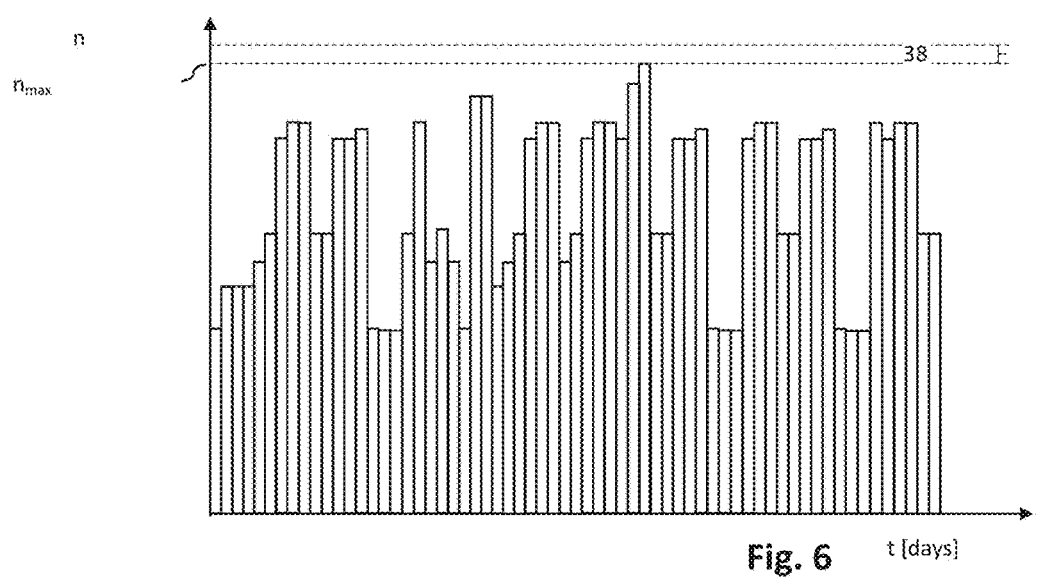
FIG. 6 illustrates a graph depicting the expected number of scaffolding components of identical design which are used simultaneously across the time intervals of the construction plan according to FIG. 4.

With further reference to FIG. 6, in a further step 116 of the method according to the invention, the maximum number $n_{max}$ of scaffolding components 18 of identical design which are used simultaneously across all phases or time intervals 36 of the construction schedule 30 is determined for each individual scaffolding component 18. According to the invention, this may advantageously be done by means of the computer software 26. FIG. 6 shows a graph in which, the number of scaffolding components 18, for instance, stairwells 18c (FIG. 2), of identical design which are used simultaneously is depicted over the plurality of time intervals 36 of the construction schedule 30 in accordance with FIG. 5.

In a further step 118, for constructing the industrial plant 12, the maximum number $n_{max}$ of scaffolding components 18 of identical design alone, or the maximum number $n_{max}$ of scaffolding components 18 of identical design additionally including a defined number of a buffer 38 of said scaffolding components 18 of identical design, are provided. The buffer 38 serves to compensate, in particular, for scaffolding components 18 which are broken or lost during transport or use in order to prevent delays of the construction work.

The method according to the invention further comprises step 120, namely beginning of assembly of the respective scaffolding units 16 to be used in a respective section (or phase) of construction of the industrial plant from the scaffolding components 18 each required for this purpose on-site (that is right in the respective section of construction) at a point in time $t_p$ which is chosen in dependency of the erection time $t_a$ specified for each at the latest prior to the start S of construction using the aforesaid scaffolding units 16 in the respective section or subsection of construction as specified in the construction schedule 30.

During the construction of the industrial plant 12, a current status of the construction progress of industrial plant 12 may be obtained in step 122 of the method 100 according to the invention with deviations of the construction progress from the construction schedule 30 of the industrial plant 12 being determined. Then, in a further step 124, the construction schedule 30 may be adapted to the current status of the construction progress by repeating steps 112 and 114 as per above. The total number of scaffolding components 18 of identical design or the buffer 38 of scaffolding components of identical design for further construction of the industrial plant is increased in further step 126, if the maximum number of scaffolding components 18 of identical design which are used simultaneously during future time intervals 36 of the adapted construction schedule 30 is greater than the number of scaffolding components 18 of identical design which have been provided, that is are available on the construction site of the industrial plant 12. The aforementioned steps 114, 116, 118 are preferably carried out at intervals, in particular on a daily basis, such that an imminent shortage of the required scaffolding components can be reliably anticipated and prevented throughout the construction process.

Preferably, the determining of the components 18 of identical design which are used simultaneously across the time intervals 36 is, in each case, performed by taking into consideration the transfer time of the scaffolding components from a respective job or storage site to their destination at a respective construction section.

Reference is now made again to FIG. 4. According to the invention, at least part of the scaffolders 40 responsible for assembling the scaffolding units 16, may be provided with an assembly order 42' for assembling the scaffolding units 16 from the required scaffolding components 18 at the location of the respective construction section by radio using a transmission and receiver unit 44 coupled with the said computer 20/software 26. The work order is preferably automatically generated by the software 26 and may, in particular, be transmitted via a wireless network 46 according to the GPRS, EDGE, UMTS, LTE or any other suitable wireless standard.

Further, according to the invention, transport workers 48 may be provided with a transport order 42 for transporting said scaffolding components 18 necessary for assembling of said scaffolding units 16 to the location of said respective construction section by means of the computer software and the transmission and receiver unit. The transport order may be preferably automatically generated by the software and transmitted via a wireless network 46. According to FIG. 4, a receipt and/or completion of the respective transport/assembly order may be confirmed wirelessly with a mobile device 50 and documented electronically by means of the software 26 after receipt.

What is claimed is:

1. A method for providing and assembling scaffolding units, each of which will be assembled from individual scaffolding components for constructing an industrial plant comprising:
   a) Providing a 3D construction plan of the industrial plant in a computer-readable electronic format, the 3D construction plan having a plurality of construction sections;
   b) Providing a construction schedule for the industrial plant in a computer-readable electronic format, the construction schedule depicting the plurality of construction sections to be realized simultaneously and/or successively;
   c) Selecting and drawing of scaffolding units to be used in each of the construction sections of the industrial plant in the 3D construction plan using a computer;
   d) Specifying an erection time required to erect the respective scaffolding unit using the computer;
   e) Specifying a dismantling time required to dismantle the respective scaffolding unit using the computer;
   f) Dividing the construction schedule into time intervals using the computer;
   g) Calculating for every single time interval, while taking into consideration the erection and dismantling times of the scaffolding units, a respective number of scaffolding components of identical design which are used simultaneously by using the computer;
   h) Determining a maximum number of scaffolding components of identical design which are used simultaneously across all time intervals using the computer;
   i) Providing in the computer one of: (i) a maximum number of scaffolding components of identical design alone, and (ii) a maximum number of scaffolding components of identical design including a defined number of a buffer of scaffolding components of identical design; and
   j) assembling the scaffolding units to be used in a respective construction section from the scaffolding components the specified erection time prior to a start of construction in the respective construction section specified in the construction schedule.

2. Method according to claim 1, wherein during construction of the industrial plant, the following steps are carried out at intervals, in particular on a daily basis:
   Obtaining a current status of the construction progress of the industrial plant and determining the deviations of the construction progress from the construction plan of the industrial plant;
   Adapting the construction schedule to the current status of the construction progress, wherein steps 1f) and 1g) are repeated; and
   Increasing a defined number of a buffer of scaffolding components of identical design for the further construction of the industrial plant, if the maximum number of scaffolding components of identical design which are used simultaneously during the future time intervals of the adapted time schedule is greater than the number of available scaffolding components of identical design.

3. Method according to claim 1, wherein the construction schedule is divided into equal time intervals.

4. Method according to claim 3, wherein the construction schedule is divided into time intervals of 8, 12 or 24 hours length.

5. Method according to claim 1, wherein the erection time of the respective scaffolding unit is specified depending on the number of scaffolding components necessary for erection of the scaffolding unit and/or depending on the projected height of the scaffolding unit.

6. Method according to claim 1, wherein determining the number of scaffolding components of identical design which are used simultaneously across all time intervals is, in each case, performed by taking into consideration the transfer times of the scaffolding components from a respective job or storage site to a respective construction section.

7. Method according to claim 1, wherein, in method steps d) and e), available weather and/or climate data for the geographic location of the industrial plant to be erected are considered.

8. Method according to claim 1, wherein method steps d) and e) are carried out by taking into consideration a number of scaffolders available or wherein the number of scaffolders available is provided for carrying out method steps d) and e).

9. Method according to claim 1, wherein a computer software is used.

10. Method according to claim 9, further comprising: communicating to at least part of the scaffolders by means of the computer software, a transmission and receiver unit coupled with the software, and a radio, a work order for assembling the scaffolding units for a respective construction section from the scaffolding components necessary for said scaffolding units at the location of said respective construction section.

11. Method according to claim 10, wherein a receipt and/or completion of the order is confirmed with a wireless mobile device and documented electronically by means of the software.

12. Method according to claim 9, wherein, by means of the computer software and a transmission and receiver unit coupled with the software, transport workers are provided with a transport order for transporting said scaffolding components necessary for assembling of said scaffolding units to the location of said respective construction section by radio.

* * * * *